Patented Apr. 28, 1942

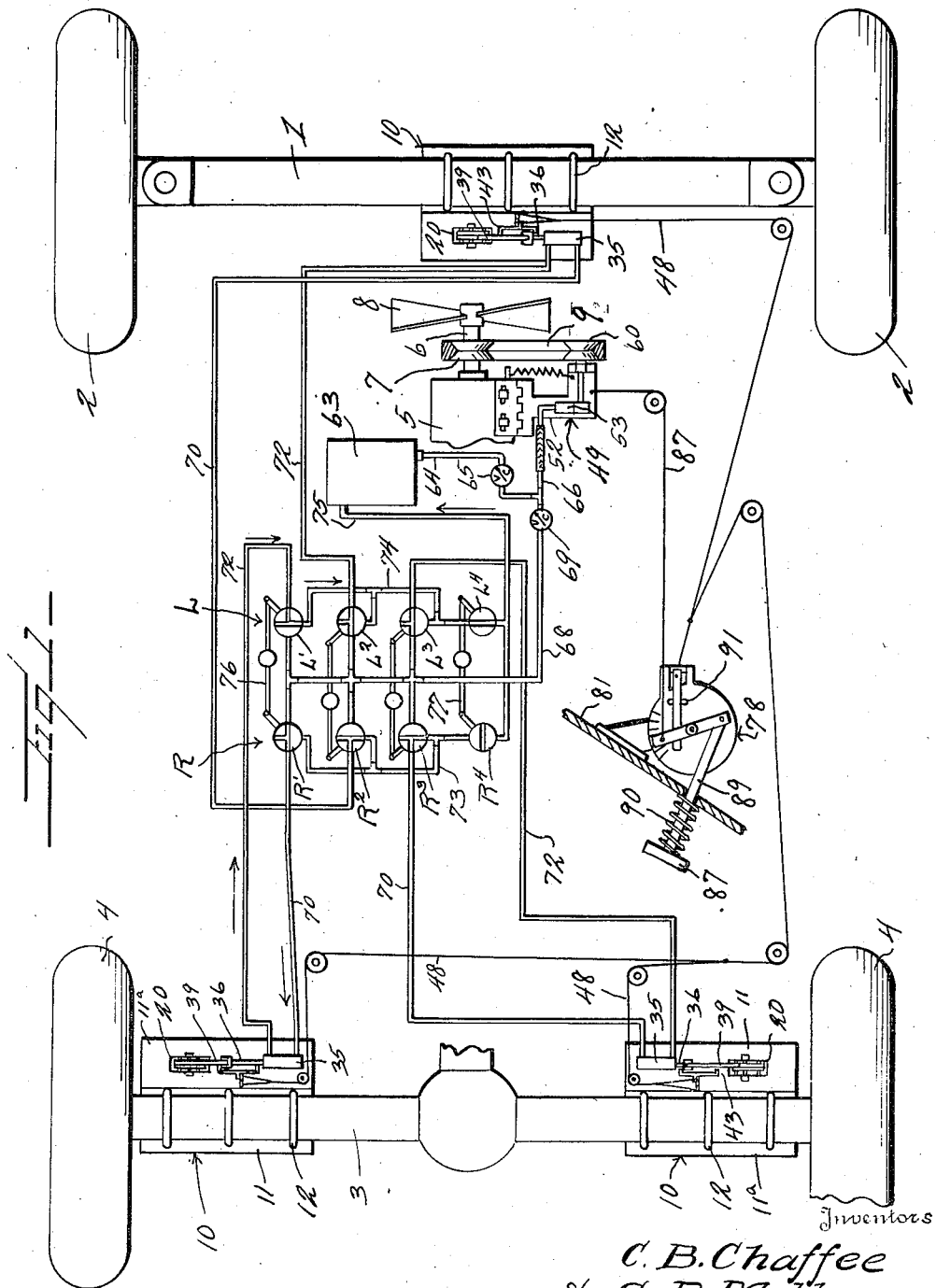

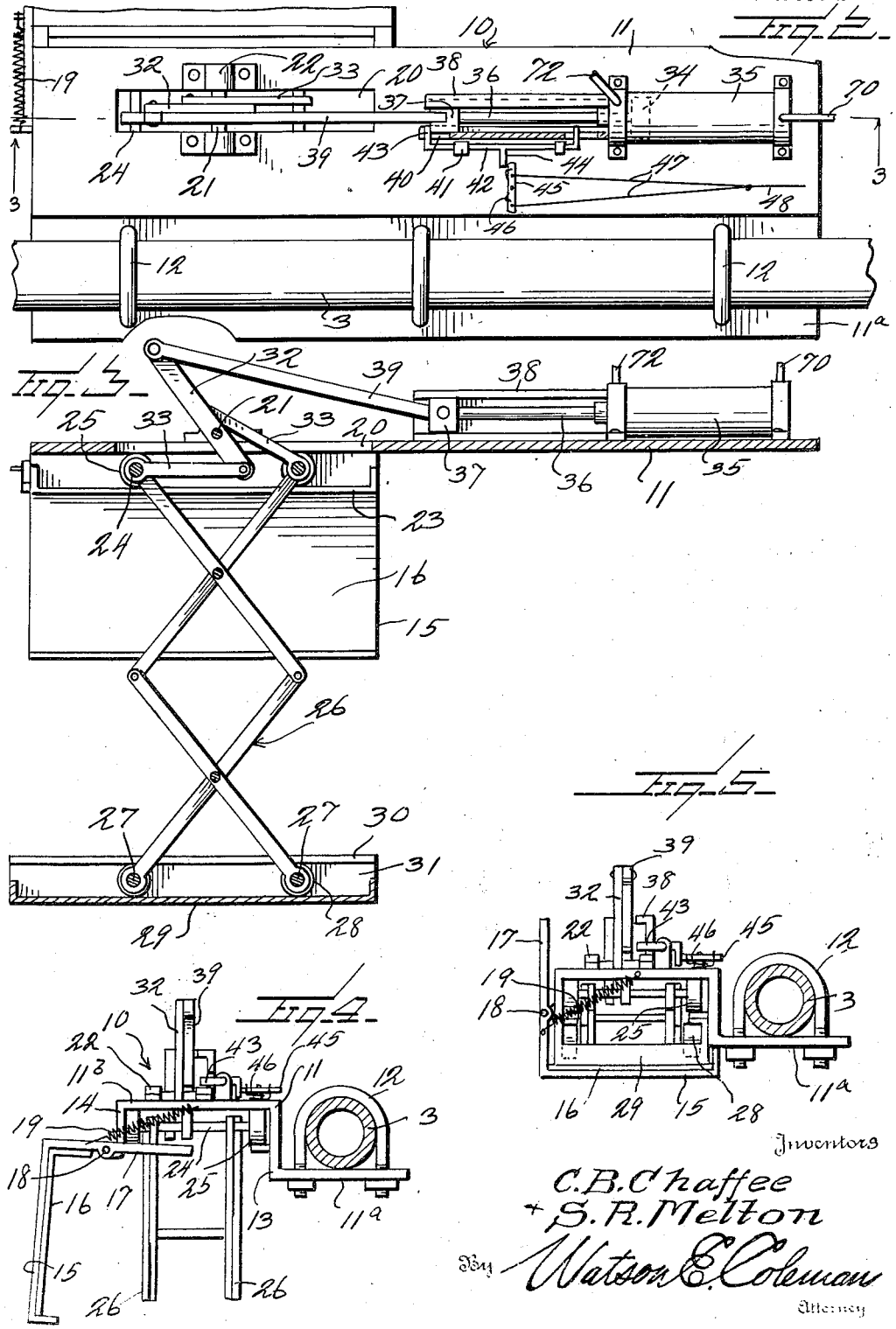

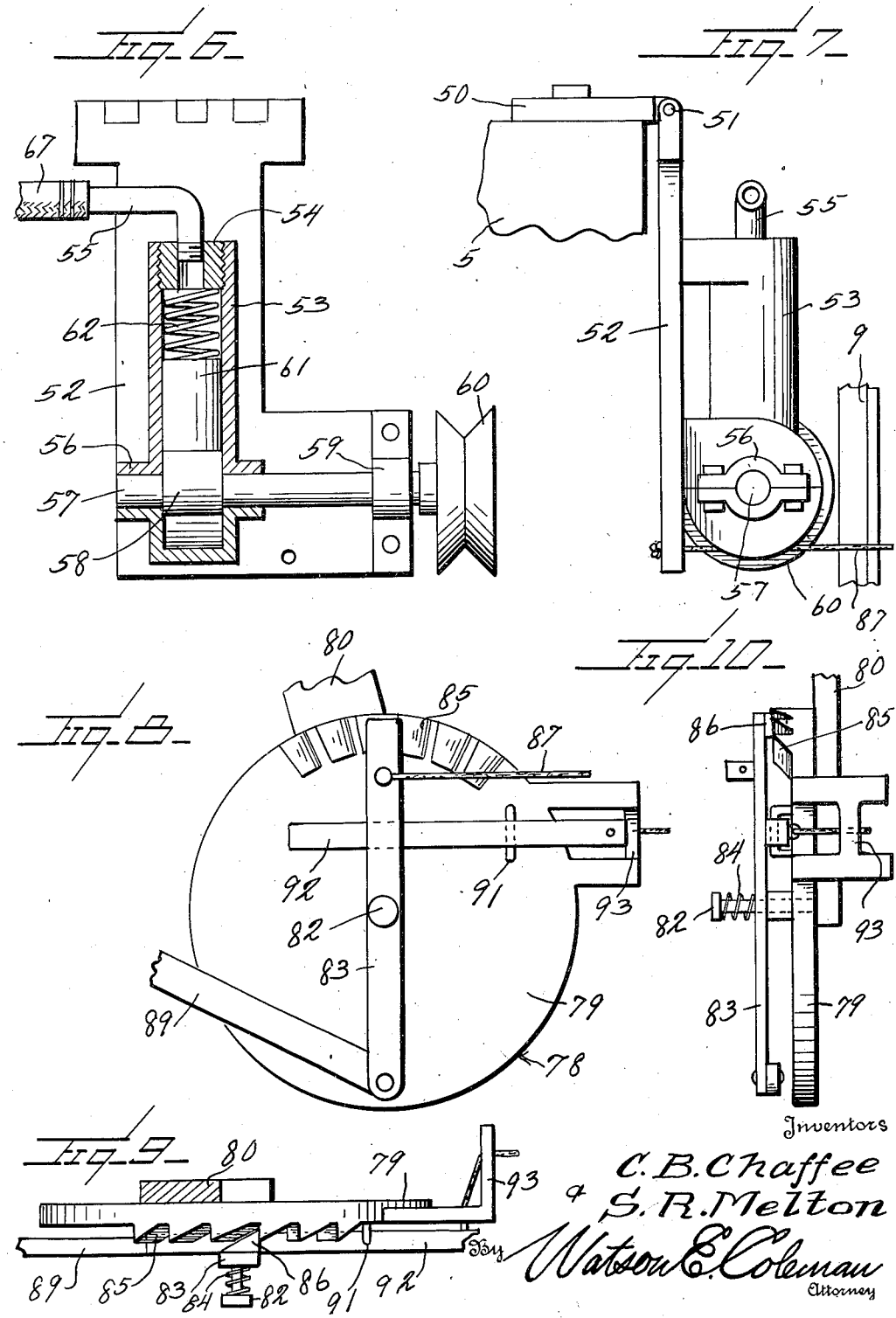

2,281,413

UNITED STATES PATENT OFFICE 2,281,413

MOTOR VEHICLE JACK

Court B. Chaffee and Scott R. Melton, Memphis, Tenn.

Application January 22, 1941, Serial No. 375,519

8 Claims. (Cl. 254—86)

This invention relates to motor vehicle jacks or raising mechanisms and pertains particularly to an improved jacking or lifting mechanism for a motor vehicle which forms a part of the vehicle structure.

The primary object of the present invention is to provide a hydraulic jack mechanism for motor vehicles which forms a part of the vehicle structure and which may be easily and quickly operatively coupled with a moving part of the motor vehicle engine to effect the lifting of any one or of all of the wheels of the vehicle from the ground whereby the changing of tires or the performance of other operations which necessitate the raising of the vehicle wheels, may be readily accomplished.

Another object of the invention is to provide a jacking mechanism for a motor vehicle which is manually placed in operative connection with a part of the motor vehicle engine to effect the desired operation of a lifting unit and which functions automatically when the said lifting unit has operated a predetermined length of time, to stop the operation of the unit through disconnection of the mechanism from the vehicle engine.

A further and more specific object of the invention is to provide a motor vehicle unit with lifting hydraulic jacks and a movable pumping unit adapted to be operatively coupled with the vehicle engine fan belt for the purpose of injecting fluid under pressure into the jack for the operation of the latter, the pumping unit also being employed upon the manipulation of certain control valves for effecting the reverse operation of the jack to produce the lowering of the vehicle.

Still another object of the invention is to provide in a mechanism of the character stated, a novel release or trip mechanism which functions to discontinue the operation of a fluid pump when the pump has been operating for the actuation of the jack to vehicle raised or vehicle lowered position, when the jack reaches a predetermined raised position or lowered position.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in plan of the mechanism embodying the present invention showing the same associated with portions of a vehicle running gear and with a portion of the engine of the vehicle by which the mechanism is operated.

Fig. 2 is a view in plan of a jack actuating cylinder and the trip mechanism associated therewith for stopping the operation of the fluid pump.

Fig. 3 is a sectional view taken substantially on the line 3—3 of Fig. 2.

Fig. 4 is a view in end elevation of the upper part of a jack showing in open position the housing in which the jack is enclosed.

Fig. 5 is a view similar to Fig. 4 but showing the jack housing in closed position.

Fig. 6 is a detail view of the pump, a portion of the same being in section.

Fig. 7 is a view in side elevation of the pump and supporting means therefor.

Fig. 8 is a view in side elevation and upon an enlarged scale of the foot operated pump shifting mechanism and means for releasing the pump from operating position.

Fig. 9 is a view in top plan of the mechanism shown in Fig. 8.

Fig. 10 is a side edge view of the structure shown in Fig. 8.

Referring now more particularly to the drawings, Fig. 1 shows a motor vehicle front axle 1 having the usual front supporting wheels 2 and the rear axle housing 3 and supporting wheels 4 therefor. The numeral 5 designates a portion of a conventionally illustrated motor vehicle engine upon the forward end of which there is mounted the usual fan shaft 6 carrying a belt pulley 7 and fan 8. The numeral 9 designates the fan belt which is operatively connected through means, not shown, with the crank shaft of the engine whereby during the operation of the engine, the fan 8 will be rotated.

In accordance with the present invention, there are provided three jack or lifting units, one of which is attached preferably to the central part of the vehicle front axle 1 or it may be attached to any other suitable part of the vehicle at the front in the event that the vehicle does not have a transverse front axle, this front unit being indicated generally by the numeral 10. The rear axle housing 3 is provided with a pair of the jack or lifting units 10, each being secured to the housing adjacent one end thereof, as shown. These lifting units for the front and the back end of the vehicle are all of identical construction and, therefore, a description of one will serve for all.

The jack or lifting unit 10 comprises a plate body 11 of substantial length which is bent or shaped to provide the parallel portions 11ᵃ and 11ᵇ, which are arranged in offset planes, as shown in Figs. 4 and 5, and the portion 11ᵃ is disposed lengthwise of an axle to which it is secured in a suitable manner as, for example, by means of the U-bolts 12. The portion 11ᵇ of each jack plate serves the double function of providing a top cover for the jack and a support for the operating piston and cylinder and other parts connected with the jack and, as shown in Figs. 4 and 5, there extend downwardly from the two opposite longitudinal edges of the portion 11ᵇ, the side flanges 13 and 14, the flange 13 forming the intermediate or connecting portion of the plate between the two portions 11ᵃ and 11ᵇ.

To the free edge of the flange 14, a bottom cover 15 is hinged for swinging on an axis extending lengthwise of the plate and the inner surface of this cover is provided with a suitable sound-deadening material such as rubber or the like, indicated by the numeral 16, and one end of the cover is provided with an arm 17 which extends inwardly from the flange 14, as shown in Fig. 4, when the jack is in extended position.

The pivotal axis for the cover 15 is indicated at 18 and a contractile spring 19 is connected with the portion 11ᵇ of the jack plate and with the cover 15 upon the side of the pivot 18 remote from its point of connection with the portion 11ᵇ so that in the opening and closing of the cover 15, the spring moves across the axis of the cover and imparts a snap action to the movement of the cover so as to quickly swing it either to opened or closed position.

The portion 11ᵇ of the jack plate is provided with a longitudinal slot 20 across which extends a rock shaft 21 supported at its ends in bearings 22 which are mounted upon the top of the plate. Upon the inner faces of the flanges 13 and 14 are secured the spaced parallel track rails 23 and extending transversely of the jack cover are axles 24 which carry on their ends the rollers 25 which are supported upon the tracks 23, as shown in Fig. 3. Each jack includes a pair of lazy-tong units, each of which is indicated generally by the numeral 26, and the units of each pair are disposed in spaced side by side relation. The axles 24 connect together the upper ends of the pair of lazy-tong units, each axle having an end of one of two crossed links of the unit connected thereto, as shown in Fig. 3, and thus it will be obvious that as the axles are moved outwardly or apart, the lazy-tong units will be contracted or folded and as they are moved together, the units will be extended.

The opposite or lower ends of the lazy-tong units of each pair likewise have the crossed terminal links connected with axles 27 which correspond to the axles 24, and these latter axles carry rollers 28 upon their ends which are slidably engaged with a jack foot plate 29 by being interposed between the body of the plate and a flange 30 which is turned inwardly from the upper edge of each side wall 31 of the plate.

The shaft 21 supports an operating crank 32, one end of which extends down through the slot 20, as shown in Fig. 3 while the other end extends upwardly therefrom and links 33 connect the crank 32 from points above and below the shaft with the upper axles 24, as shown in Fig. 3. Thus it will be apparent that upon oscillation of the crank 32 on the shaft 21, the axles will be separated or drawn together to effect the extension or retraction of the lazy-tong units and the consequent extension or raising of the jack foot plate 29.

When the jack foot plate 29 is raised, it will enter the space between the flanges 13 and 14 and it will strike the arm 17 of the cover so as to swing it to a sufficient extent to cause the tensioned spring 19 to pull the cover upwardly into position beneath the foot plate 29, as shown in Fig. 5, and when in this position, the sound-deadening covering 16 will press against the bottom of the foot plate and hold it in place and keep the jack from being noisy when retracted.

The actuation of the jack moving lever 32 is accomplished by means of a fluid actuated piston 34 which is housed within a fluid cylinder 35 mounted upon the portion 11ᵃ of the jack plate, as shown in Fig. 2. Connected with this piston 34 is a rod 36 which is connected to a head 37 mounted for reciprocation between spaced guides 38. A link 39 connects the head 37 with the upper end of the lever 32.

One of the guides 38 is provided with a pair of spaced longitudinally extending slots 40 and reciprocably mounted in guide eyes 41 at the outer side of the guide in which the slots 40 are formed, is a shift rod 42 having at each end a finger 43 which extends through a slot 40 into the path of the head 37. Intermediate its ends is a trip finger 44 which is arranged so that in its back-and-forth movement, which is accomplished by the alternate engagement of the head 37 with the fingers 43, it rides across an end of a spring-controlled rocker arm 45 to rock the same from a normal position in which it is resiliently held by a spring 46. The rocker arm 45 has connected therewith upon opposite sides of its pivot, the two pull cables 47 which converge and join a single pull cable 48. These pull cables 47 and 48 operate upon oscillation of the rocker arm 45 to bring about the stopping operation of the hereinafter described fluid pump which supplies fluid to the selected end of the piston cylinder 35. The fluid pump unit for the present jacking mechanism is indicated as a whole by the numeral 49 and is mounted adjacent to the fan belt 9, preferably upon the engine 5, as shown in Fig. 1. As shown in Figs. 6 and 7, there is provided for the pump unit a fixed plate 50 which may be bolted to the engine block and which has hingedly coupled therewith for oscillation on the axis 51, the depending oscillatable plate 52 on which the pump is mounted. The pump comprises a cylinder 53 which is here illustrated as being secured vertically to a face of the suspension plate 52 and which is closed at one end by a tubular plug 54 with which is connected an end of a fluid conducting pipe 55. Adjacent the other end of the cylinder 53 from the plug 54, opposite bearings 56 are provided through which extend the cam shaft 57 which passes through the cylinder and which supports within the cylinder the cam or eccentric 58. The outer end of the shaft 57 is suitably supported in a bearing collar 59 and carries a pulley 60 which is arranged, with respect to the belt 9, so that when the pump carrying plate 52 is oscillated in one direction, here shown as being outwardly or away from the engine block 5, the pulley will come into operative connection with the belt 9, so that the shaft 57 will be given rotation. Within the pump cylinder 53 is a pump piston 61 and this piston is normally urged into contact with the cam or eccentric 58 by the expansion spring 62 which is interposed between the piston and the plug 54.

The numeral 63 designates a reservoir for a suitable fluid to be employed in operating the jack pistons 34. An outlet pipe 64 is provided for the reservoir which leads through a check valve 65 to a pipe 66 which is coupled by a flexible coupling pipe 67 with the pipe 55. This flexible pipe 67 permits the necessary movement of the pump with respect to the pipe line through which the fluid is transmitted to the jack cylinders.

Connected with the pipe 66 is a fluid supply or distributing pipe 68 and in this pipe there is placed a check valve 69 which opens only in the direction away from the pipe 66 which communicates directly with the pump cylinder. The valve 65 leading from the reservoir opens toward the pipe 66. Thus it will be seen that when the pump piston 61 moves inwardly under the action of the spring 62, the fluid will be drawn past the valve 65 into the line 66, and when the piston moves outwardly in the cylinder, the fluid will be forced from the line 66 past the valve 69 and into the distributing line 68.

By means of groups of control valves connected between the supply pipe 68 and the piston cylinders of the jack units, the fluid pumped from the pumping unit 49 may be controlled or distributed to effect the actuation of any selected one of the jack pistons or all of the pistons simultaneously, if desired, to extend or retract the jacks for the raising and lowering of the vehicle wheels. These valves are arranged as shown in Fig. 1, in two groups, one group being generally designated by the character R to designate raising, and the other group being generally indicated by the character L to designate lowering, and the individual valves of the group R are designated $R^1$, $R^2$, $R^3$ and $R^4$, while the individual valves of the group L are designated $L^1$, $L^2$, $L^3$ and $L^4$. The 1, 2 and 3 valves of group R and of group L are three-way valves, as shown, while the 4-valve of each group is an ordinary two-way valve.

Leading from each of the valves $R^1$, $R^2$ and $R^3$ is a pipe line 70, which connects with that end of each jack cylinder 35 which is remote from the rod of the piston therein and leading outwardly from each of the valves $L^1$, $L^2$ and $L^3$ is a pipe 72 which connects with the opposite end of a jack cylinder. The distributing or supply pipe 68 leading from the pump is connected, as shown in Fig. 1, which each of valves $R^1$, $R^2$ and $R^3$, and valves $L^1$, $L^2$ and $L^3$, so as to supply fluid under pressure to these valves, as desired.

Connected with each of the valves $R^1$, $R^2$ and $R^3$ and leading to one side of the valve $R^4$ is a collector pipe 73, while connected with each of the valves $L^1$, $L^2$ and $L^3$, and leading to one side of the valve $L^4$, is a collector pipe 74, and these collector pipes join a common fluid return pipe 75 which leads back to the reservoir 63.

From the foregoing, it will be seen that each jack cylinder 35 has common thereto an R valve and an L valve forming a cooperating pair for supplying fluid to and leading fluid from selected ends of the cylinder and each pair of valves is coupled together by a control link or in any other suitable manner, as indicated at 76, so that when one valve of a pair is turned to a position where it will direct fluid from the pump into one end of the associate jack cylinder, the other valve of the pair will be turned to a position where it will direct the fluid which flows back from the other end of the cylinder into the adjacent collector pipe for return by way of pipe 75 to the reservoir.

Also the two one-way valves $R^4$ and $L^4$ are coupled together by a common link 77 or in any other suitable manner so that when one is opened, the other is closed.

Upon reference to Fig. 1, it will be seen that the pair of valves $R^1$, $L^1$ are adjusted so that fluid may be directed through $R^1$ and through the raising line 70 to the cylinder of the jack which is supported adjacent the rear left wheel of the vehicle and so that fluid may return from this cylinder through the valve $L^1$ and the valve $L^4$ to the reservoir. All of the other valves are closed and thus it will be seen that only the one jack unit will be operative. If all of the jack units are to be operated at one time, then all three of the controls 76 will be thrown to the position in which the control for the valves $R^1$, $L^1$ is shown, and the fluid may enter all of the jack cylinders to extend the jacks. When the jacks are to be lowered, all of the controls 76 and the control 77 will be thrown to the opposite position or into the position in which the controls for the two pairs of valves $R^2$, $L^2$ and $R^3$, $L^3$ are shown, whereupon the fluid will be pumped through the lines 72 into the jack cylinders and will be returned from the jack cylinders by way of the lines 70.

For the automatic control of the pump whereby after it has been set in operation, it will be automatically stopped when the jacks have reached their fully raised or fully lowered positions, there is provided the mechanism indicated in Fig. 1 generally by the numeral 78 and shown in detail in Figs. 8, 9 and 10. This might be referred to as the pump starting and stopping mechanism and it comprises a plate 79 which is mounted by a suitable bracket 80 preferably upon the under side of the floorboard or footboard 81 of the vehicle. At the center of this plate 79 is a stud 82 which passes through and supports a ratchet finger 83. Between the finger 83 and the head of the stud 82 is an expansion spring 84 which normally forces the finger inwardly toward the plate but permits the finger to be shifted away from the plate for the purpose about to be described.

Adjacent the periphery of the plate 79 is a series of ratchet teeth 85 over which the tooth 86 which is carried at one end of the finger 83 rides when putting the pump into operation. To this toothed end of the finger 83 is connected an end of a pull cord 87, the other end of which is connected with the pump supporting plate 52 passing over suitable pulleys, as shown in Fig. 1, so that when the finger is oscillated in one direction, a pull will be applied to the plate 52 to swing the same in a direction to bring the pulley 60 into connection with the fan belt 9.

Means is provided whereby the actuation of the finger 83 to start the pump operating may be accomplished by means of the foot, such actuating means consisting of a pedal 88 connected by the stem 89 with the end of the finger 83 remote from the toothed end. This stem 89 slides through the footboard 81 and is normally urged in a direction to move the pedal away from the footboard by the spring 90. When the stem is forced down or forwardly, it oscillates the finger to apply a pull to the cable 87 and also causes the toothed end of the finger to ride over the ratchet teeth and to engage one of the teeth and be held thereby to maintain the pump pulley in operative connection with the fan belt.

Upon the plate 79 is a fulcrum 91 upon which is rockably supported a release arm 92, one end of which extends between the plate 79 and the finger 83 adjacent the toothed end of the latter. The other end of this release arm has connected therewith the cables 48 which lead from the rocker arms associated with the several jack units. Any suitable means may be provided to insure that when a pull is applied to any one of the cables 48, the release arm 92 will be rocked on its fulcrum so as to lift the toothed end of the release finger from engagement with the ratchet teeth and permit the spring 90 to rock the finger in a direction which will permit the pump pulley 60 to move out of engagement with the fan belt. The means here shown comprises, as shown in Figs. 10 and 11, the provision of a guide bar 93 which is offset from the plane of the plate 79, across which is guided one of the pull cables 48 which is attached to the release arm and which has the other cables connected therewith, as shown in Fig. 1. Thus it will be seen that when a pull is applied to the cable 48 which is attached to the release arm, the end of the release arm which is remote from the finger 83, will be pulled back so as to raise the other end of the release arm and shift the finger 83 outwardly against the tension of the spring 84, so that the toothed end thereof will be freed from the ratchet tooth 85 with which it is engaged.

From the foregoing it will be readily seen that when the raising and lowering valves are properly set as, for example, when they are set, as shown in Fig. 1, so as to effect the operation of the jack unit associated with the left rear wheel of the vehicle so that only this wheel will be raised, the operator upon depressing the pedal 87, causes the ratchet finger 83 to be rocked in a direction to pull the pump pulley into operative direction with the fan belt, thus starting the pump to operating. Through the engagement of the toothed end of the finger 83 with a ratchet tooth 85, the pump will be held in this position and fluid will be continuously pumped through the valve R¹ and pipe 70 connected therewith to move the jack unit piston in a direction for the extension of the jack. During this action of the piston of this particular jack unit, the fluid in the end of the cylinder toward which the piston is moving will be ejected and will return to the reservoir 63 by way of the line 72 which leads to the valve L¹ and by way of the valve L⁴. When the jack reaches its fully extended position, the head 37 will engage one end finger of the slide bar 42 and cause the intermediate finger 44 of the bar to move across the adjacent end of the rocker arm 45. This will rock the arm 45 and exert a pull upon the attached cable 48, thus causing the oscillation of the release arm 92, which will effect the release of the ratchet finger 83, permitting the pump to swing back and remove its pulley 60 from engagement with the fan belt, as previously described. Thus the extension of the jack and lifting of the car will be stopped. When the operator desires to lower the car by retracting the jack, the control 76 connected with the valves R¹, L¹, is swung to the opposite position and the control 77 for the valves R⁴ and L⁴ is also swung to the opposite position from which it is shown in Fig. 1. The pedal 87 is again depressed to again bring the pump into operative connection with the fan belt, whereupon the fluid will be pumped in the opposite direction passing from the line 68 through the valve L¹ and through the line 72 leading therefrom into the jack cylinder while the fluid from the other side of the piston in the jack cylinder will return to the reservoir by way of valve R¹ and the pipe 70 connected therewith and by way of the collector pipe 73, valve R⁴ and return pipe 75.

When the jack foot returns to its position under the portion 11ᵇ of the cover plate, the cover 15 will be returned to closed position and at the same time the head 37 will actuate the slide 42 in the opposite direction for the oscillation of rocker arm 45, pulling upon the cable 48 and effecting the release of the ratchet finger 83 in the manner previously described so as to permit the pump pulley to move out of connection with the fan belt.

What is claimed is:

1. In combination with a vehicle having a motor driven power take-off and wheel supported axles, a jack unit secured to an axle, said unit including a cylinder and a piston in the cylinder, a pump including a rotary drive element, a fluid reservoir, means for conducting fluid under pressure from the reservoir to the jack cylinder and for returning the fluid from the cylinder to the reservoir by and upon operation of the pump, means for controlling the flow of fluid to and from the reservoir, supporting means for the pump facilitating movement of the rotary drive element thereof into operative connection with said power take-off for the driving of the pump, and means operated by the piston of the jack unit for breaking the connection between the drive element and power take-off after a predetermined movement of the piston of the jack unit.

2. In combination with a vehicle having a motor driven power take-off and wheel supported axles, a jack unit secured to an axle, said unit including a cylinder and a piston in the cylinder, a pump including a rotary drive element, a fluid reservoir, means for conducting fluid under pressure from the reservoir to the jack cylinder and for returning the fluid from the cylinder to the reservoir by and upon operation of the pump, means for controlling the flow of fluid to and from the reservoir, supporting means for the pump facilitating movement of the rotary drive element thereof into operative connection with said power take-off whereby the pump will be driven by the belt, said pump supporting means being swingable for facilitating the stated movement of the rotary drive element, manual means for swinging the pump support to effect the said operative connection of the drive element with the power take-off, releasable means for holding the pump supporting means after said manual operation, and means operated by the jack unit piston after a predetermined stroke of the piston of the jack unit for releasing the pump holding means to effect disconnection of the drive element from said power take-off.

3. A jack system of the character described, comprising a jack unit including an extensible and retractible element, a cylinder and a piston in the cylinder operatively coupled with said element to extend or retract the same, a fluid reservoir, a pair of three-way valves, a return flow pipe line leading from each of said three-way valves to the reservoir, pipe lines leading from said three-way valves to opposite ends of said cylinder, a supply pipe line leading from the reservoir to each of said three-way valves, a pump connected with the supply line for withdrawing fluid from the reservoir and pumping the same through a valve to one end of the cylinder, a valve in each of said return pipe lines, and means for driving the pump.

4. A jack mechanism for a motor vehicle having an engine driven power take-off and wheel supported axles, comprising a jack unit secured to an axle and including an extensible and retractible element, a fluid cylinder and a piston in the cylinder operatively coupled with said element, a fluid reservoir, fluid lines connecting opposite ends of said cylinder with said reservoir for conducting fluid from the reservoir to one end of the cylinder and from the other end of the cylinder back to the reservoir, control valves in said lines for selectively controlling the direction of flow between the two ends of the cylinder and the reservoir, a fluid pump operatively coupled with one of said pipe lines between the reservoir and the valves, said pump including a rotary drive member, supporting means for the pump facilitating shifting of the same for movement of the drive member into and out of operative connection with said power take-off, means for moving the pump member into operative connection with the power take-off and securing the member in such position, and means for releasing the securing means for the pump supporting means including a reciprocable trip member arranged to be actuated by said piston when the same moves to either of two operating positions.

5. A jack mechanism for a motor vehicle having a motor driven power take-off and wheel supported axles, comprising a jack unit secured to an axle and including an extensible and retractible element, a fluid cylinder and a piston in the cylinder operatively coupled with said element, a fluid system having said cylinder connected therein and including a fluid reservoir, a fluid pump and valves for the control of the fluid to and from the cylinder, said pump including a rotary drive member, an oscillatable support to which the pump is attached, the support when moved in one direction coupling the drive member with said power take-off, a rockable latching finger having an operative and inoperative position, ratchet teeth engaged by the finger when in its operative position, a cable connected between said finger and the pump support and shifting the pump support to engage the drive element with the power take-off when the finger is in its operative position, a release element adjacent said finger for disengaging the same from the ratchet teeth whereby the finger may move to inoperative position, a trip element arranged for engagement by said piston upon movement of the same to a predetermined position, and an operative coupling between the trip element and said release element whereby upon movement of the piston to the said one position the release element will be made operative to effect disengagement of the finger from the ratchet teeth whereby movement of the pump drive element from connection with the power take-off may be effected.

6. In a motor vehicle jack mechanism, a fluid actuated jack unit, comprising a supporting plate adapted to be secured to an axle of the vehicle, a fluid cylinder supported on the plate, a piston in the cylinder, a rock shaft carried by the plate, a lever supported upon the rock shaft and operatively coupled with the piston to be rocked thereby, a lazy-tong having an end operatively coupled with the plate, link connecting means between the said end of the lazy-tong and the lever for effecting extension and retraction of the lazy-tong, a ground engaging foot operatively connected with the other end of the lazy-tong, said lazy-tong when retracted moving said foot into inoperative position against a side of the plate, and means for introducing fluid into and withdrawing fluid from said cylinder to effect reciprocation of the piston.

7. In a motor vehicle jack mechanism, a fluid actuated jack unit, comprising a supporting plate adapted to be secured to an axle of the vehicle, a fluid cylinder supported on the plate, a piston in the cylinder, a rock shaft carried by the plate, a lever supported upon the rock shaft and operatively coupled with the piston to be rocked thereby, a lazy-tong having an end operatively coupled with the plate, link connecting means between the said end of the lazy-tong and the lever for effecting extension and retraction of the lazy-tong, a ground engaging foot operatively connected with the other end of the lazy-tong, said lazy-tong when retracted moving said foot into inoperative position against a side of the plate, means for introducing fluid into and withdrawing fluid from said cylinder to effect reciprocation of the piston, a cover element pivotally attached to the plate and having an open position in which it is disposed at one side of the lazy-tong and a closed position, when the lazy-tong and foot are retracted, in which it lies parallel with the plate and covers the retracted foot, and means coupled with said cover by which the movement of the cover to open and closed position is effected by the plate upon extension and retraction of the lazy-tong.

8. In a mechanism of the character stated for use on a motor vehicle having a power source, a series of fluid actuated power units carried by the vehicle, each including an element having rectilinear movement, a fluid pump having a shaft adapted for operative coupling with the power source, means oscillatably supporting the pump facilitating movement of the latter in a direction to establish an operative driven connection with the power source, a fluid supply means, valve controlled means between the supply means, the pump and the power units whereby rectilinear movement may be imparted to the said elements of the power units upon operation of the pump, means connected with the pump support and operable by an occupant of the vehicle for establishing and securing the said driven coupling between the pump and the power source, and mechanism operatively coupled with said last means and with the power units which is actuated by the said elements of the power units after a predetermined stroke of rectilinear movement in either of two directions for releasing the said last mentioned means to disestablish the coupling between the pump and power source.

COURT B. CHAFFEE.
SCOTT R. MELTON.